(12) United States Patent
Hilarius et al.

(10) Patent No.: US 6,337,160 B1
(45) Date of Patent: *Jan. 8, 2002

(54) MANGANESE DIOXIDE ELECTRODES, PROCESS FOR PRODUCING THE SAME AND THEIR USE

(75) Inventors: Volker Hilarius, Gross-Umstadt; Gerhard Pfaff, Münster; Ralf Glausch, Darmstadt; Dietmar Rahner, Dresden; Waldfried Plieth, Ockerwitz; Matthias Kloss, Dresden, all of (DE)

(73) Assignee: Merck Patent Gesellschaft mit beschrankter, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,621
(22) PCT Filed: Jan. 21, 1998
(86) PCT No.: PCT/EP98/00309
 § 371 Date: Oct. 5, 1999
 § 102(e) Date: Oct. 5, 1999
(87) PCT Pub. No.: WO98/34289
 PCT Pub. Date: Aug. 6, 1998

(30) Foreign Application Priority Data

Jan. 31, 1997 (DE) .......................... 197 03 480
Nov. 11, 1997 (DE) .......................... 197 49 763

(51) Int. Cl.$^7$ ............................................ H01M 4/80
(52) U.S. Cl. ............... 429/236; 252/500; 252/503; 252/506; 252/518.1; 252/519.2; 252/520.1; 429/209; 429/218; 429/222; 429/224; 429/229; 429/232

(58) Field of Search ................................ 252/500, 503, 252/506, 507, 509, 518.1, 519.2, 519.5, 520.1; 429/209, 218, 222, 224, 229, 232, 236

(56) References Cited

U.S. PATENT DOCUMENTS 3,883,368 A 5/1975 Kordesch et al. ......... 136/86 A (List continued on next page.)

FOREIGN PATENT DOCUMENTS

| DE | 196 41 970 | 4/1998 |
| EP | 0 747 982 | 12/1996 |
| FR | 2418965 | 9/1979 |
| JP | 57090872 | 6/1982 |
| WO | 92 17910 | 10/1992 |
| WO | 96 38866 | 12/1996 |
| WO | 97 13285 | 4/1997 |

OTHER PUBLICATIONS

Patent Abstracts of Japan, vol. 006, No. 173 (Sep. 7, 1982).
European Patent Office—Patent Abstract of Japan, Publication No. 57090872 of May 6, 1982.

Primary Examiner—Yogendra N. Gupta
Assistant Examiner—Derrick G. Hamlin
(74) Attorney, Agent, or Firm—Millen, White, Zelano & Branigan, P.C.

(57) ABSTRACT

The invention relates to novel manganese dioxide electrodes comprising modified, electrochemically active manganese dioxide, to a method for fabricating these novel manganese dioxide electrodes and to the use of these in rechargeable cells.

20 Claims, 5 Drawing Sheets

U.S. PATENT DOCUMENTS

Figure 1:
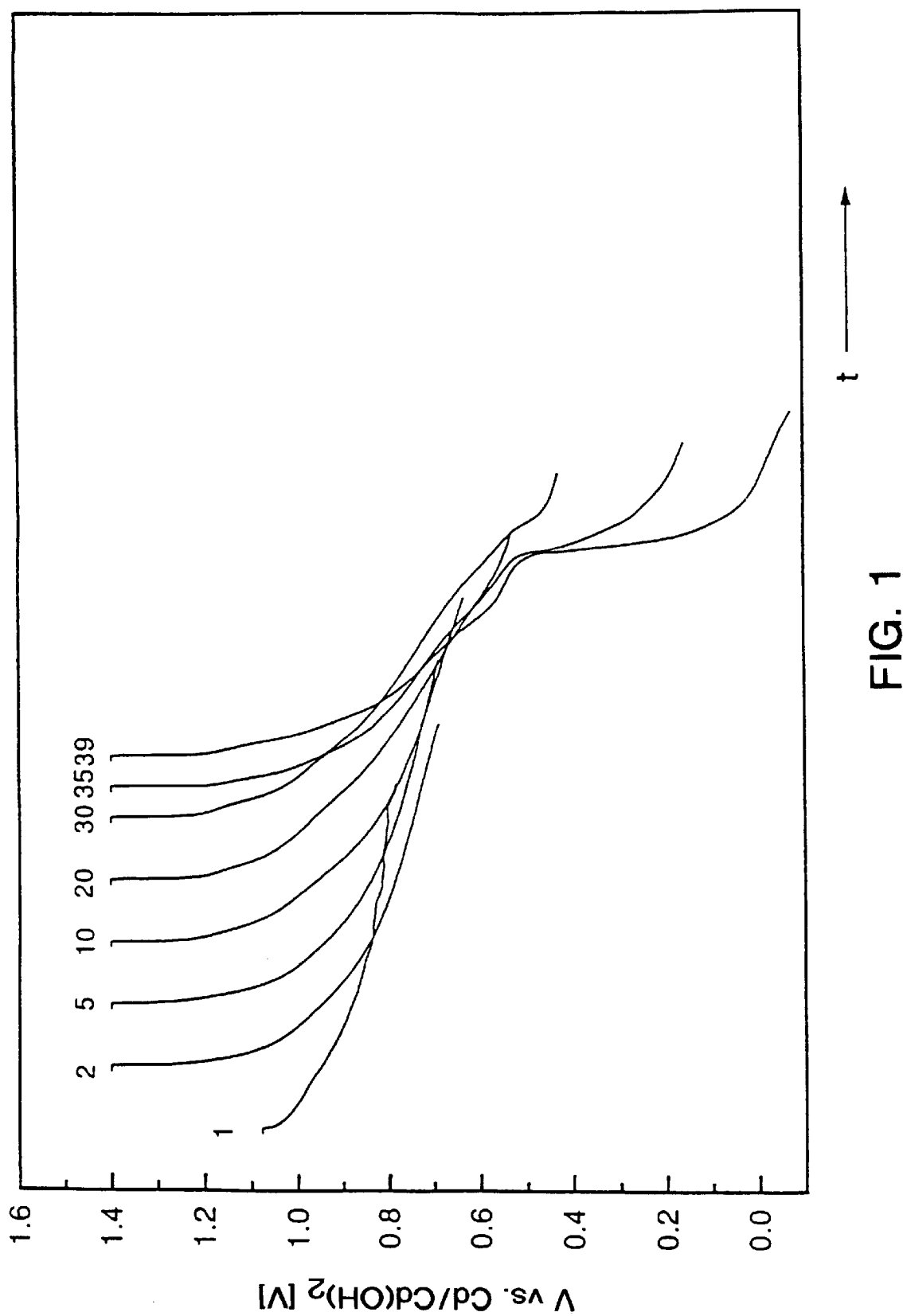

| | | | |
|---|---|---|---|
| 3,945,847 A | 3/1976 | Kordesch et al. | 136/100 R |
| 4,028,215 A | 6/1977 | Lewis et al. | 204/29 OF |
| 4,072,586 A | 2/1978 | De Nora et al. | 204/105 M |
| 4,072,588 A | 2/1978 | De Nora et al. | 204/105 |
| 4,221,853 A | 9/1980 | Tye et al. | 429/224 |
| 4,243,503 A | 1/1981 | Lieb et al. | 204/290 |
| 4,405,699 A | 9/1983 | Kruger | 429/224 |
| 4,422,917 A | 12/1983 | Hayfield | 204/196 |
| 4,451,543 A | 5/1984 | Dzieciuch et al. | 429/206 |
| 5,153,081 A | 10/1992 | Thackeray et al. | 429/144 |
| 5,156,934 A * | 10/1992 | Kainthia et al. | 429/224 |
| 5,342,712 A | 8/1994 | Mieczkowska et al. | 429/224 |
| 5,419,986 A | 5/1995 | Kainthla et al. | 429/224 |
| 5,599,644 A | 2/1997 | Swierbut et al. | 429/224 |
| 5,658,693 A | 8/1997 | Thackeray et al. | 429/224 |
| 5,674,644 A | 10/1997 | Nazri | 424/224 |
| 5,698,342 A * | 12/1997 | Klien | 429/223 |
| 5,783,328 A | 7/1998 | Wang | 429/137 |

* cited by examiner

MANGANESE DIOXIDE ELECTRODES, PROCESS FOR PRODUCING THE SAME AND THEIR USE

The invention relates to novel manganese dioxide electrodes comprising modified, electrochemically active manganese dioxide, to a method for fabricating these novel manganese dioxide electrodes and to their use in rechargeable cells.

Typical components of an alkaline primary cell are a cathode consisting of manganese dioxide, an anode preferably made of zinc, an alkaline electrolyte and an electrolyte-permeable separator material. The manganese dioxide which is customarily used for fabricating the cathode, being an electrolyte manganese black having a γ-structure, exhibits very high activity. The discharge mechanism of manganese dioxides has been studied very thoroughly in the past. An overview of such studies is provided, for example, by A. Kozowa in: Batteries, Vol. 1, Manganese Dioxide, Ed.: K. V: Kordesch, Chapter 3, Marcel Dekker 1974. The use of manganese black in alkaline zinc-$MnO_2$ cells from a commercial point of view has been set forth by R. F. Scarr and J. C. Hunter in: Handbook of Batteries, Ed. D. Linden, Chapter 10, McGraw-Hill 1995.

To increase the electrical conductivity, such manganese dioxide electrodes are customarily admixed with particles of coal, carbon black or graphite. Organic or inorganic additives are used as binders.

The zinc electrode as a rule consists of zinc powder having a large surface area and of a gelling agent, e.g. carboxymethylcellulose, as the stabilizer. Also known, however, are cold-pressed or hot-pressed elctrodes, with or without a binder, or sintered zinc powder electrodes. In addition to amalgamated zinc anodes, mercury-free zinc anodes are increasingly being used.

The alkaline electrolyte commonly consists of an aqueous potassium hydroxide solution. Alternative options, however, are solutions of other hydroxides such as sodium hydroxide solutions or lithium hydroxide solutions and mixtures thereof.

The separator material present between the electrodes has the purpose of electronically insulating the two electrodes.

On economic and ecological grounds, attempts have been made for some time to fabricate a rechargeable alkali-manganese cell.

The greatest problem in this context has so far been posed by the manganese dioxide electrode, since it does not have an adequate discharge/charging cycle stability. During discharge, protons are inserted into the $MnO_2$ lattice, as a result of which γ-$MnO_2$ is reduced to the isostructural α-MnOOH. This takes place in a homogeneous solid-phase reaction and entails expansion of the manganese black structure. If a further discharge occurs, the stability limit is exceeded, i.e. the expanded structure collapses and phases are formed which have a different crystal structure (e.g. $Mn(OH)_2$, $Mn_3O_4$). This is an irreversible collapse of the $MnO_2$ crystal lattice. After this, recharging is no longer possible. Changes in the lattice structure of the γ-$MnO_2$ commence at a degree of intercalation of about 0.8 protons per manganese atom. In the case of known rechargeable $MnO_2$—Zn cells this is taken into account by the discharge being limited either by the final discharge voltage of about 0.9 V or by the cyclable amount of zinc (K. Kordesch; K. Tomantschger and J. Daniel-Ivan in: Handbook of Batteries, Ed.: D. Linden, Chapter 34, McGraw-Hill 1995).

DE 33 37 568 A1 describes the preparation of γ-$MnO_2$ by direct-current electrolysis from manganese(II) salt solutions, which had been admixed with titanyl ions. Using the $MnO_2$ thus produced, it is possible, according to the description, for the number of discharge/charging cycles for a discharge level of 33% in alkaline aqueous electrolytes to be more than 100 cycles, more than doubled that of the reference manganese black (International Common Sample (ICS) No. 2) at 42 cycles. The publication points out that it is not possible simply by admixing the manganese black with titanium dioxide powder, to effect an improvement in the cycling capability.

EP 0 146 201 A1 describes the addition of bismuth ions and lead ions to the manganese black, as an activator. This publication claims the intensive mechanical admixing of ICS manganese black and of Na birnessite (Na, $Mn_xO_4$) with $Bi_2O_3$ (or $Bi_2S_3$) and PbO. Given a discharge level of 50% (based on the theoretical 2 e$^-$ capacity) the material obtained exhibits good cyclability. The electrodes fabricated using the material described do have a very high excess of graphite, and consequently their use in practice is likely to be problematic. The publications EP 0 136 172 A2 and EP 0 136 173 A2 describe the use of corresponding modified manganese dioxides in $MnO_2$—Zn cells.

PCT/WO92/14273 A1 describes a method for preparing manganese black which is rechargeable in aqueous solution, said method involving the impregnation or mixing of conventional γ- or β-manganese black with an aqueous solution of bismuth ions, lead ions or copper ions.

PCT/WO93/12551A1 discloses barium additives, especially barium oxide, barium hydroxide and barium sulphate as an additive to cathode pastes for alkaline zinc-manganese dioxide cells. As a result of the addition of these barium compounds, higher cumulative capacities are achieved compared with standard cells. The method of operation is described by stating that the barium ions located in the vicinity of active cathode material impede access of the zinc ions to the manganese dioxide and thus prevent or retard the formation of electrochemically entirely inactive hetaerolite (ZnO×$Mn_2O_3$). Also discussed is a positive effect on the porosity of the manganese black electrode. Corresponding barium additives are also described in U.S. Pat. No. 5,424, 145 A. This publication likewise discloses the addition of oxides, spinels and perovskites, especially compounds of nickel, cobalt, aluminium, zinc, iron, manganese, chromium, vanadium, titanium and silver. The purpose of these additives is to protect the manganese dioxide against overcharging and to prevent further oxidation to higher-valence manganese compounds such as manganates.

It is therefore an object of the invention to provide cyclically stable $MnO_2$ electrodes which are suitable for use in rechargeable alkaline cells. Another object of the invention is to provide, for the fabrication of manganese dioxide electrodes, inexpensive, suitably modified manganese dioxide which, given an effective discharge level has adequate cycle stability, ideally without any change in the lattice structure, exhibits improved reversibility characteristics compared with conventional material while discharge times are extended and cell voltages during the discharge are increased, this applying both to high and to low discharge rates. A further object of the invention was to provide an inexpensive and simple method for fabricating these modified manganese dioxide electrodes.

This object is achieved by manganese dioxide electrodes fabricated from a conventional manganese dioxide whose characteristics have been modified beforehand by the addition of coated inorganic particles.

These coated inorganic particles may be of a type where the support particles consist of a material selected from the group consisting of mica, $SiO_2$, $Al_2O_3$, $ZrO_2$ and ZnO. Single or multiple coatings of these particles may be composed of dielectric substances and in particular of ferroelectric, piezoelectric or pyroelectric substances. Such coatings may consist of titanates, stannates, tungstates, niobates or zirconates; also possible, however, are silicate coatings, depending on the type of the base particles selected. Particles with coatings from mixtures of these substances are likewise suitable. Suitable inorganic particles may also have coatings consisting of metal oxides from the group consisting of $Fe_2O_3$, NiO, CoO, $ZrO_2$, $SnO_2$, $TiO_2$, $Sb_2O_3$, PbO, $Pb_3O_4$, $Bi_2O_3$, or mixtures thereof. The individual coatings which, per se, consist of one substance may be doped with foreign ions, an example being $SnO_2$ coatings doped with foreign ions. The manganese dioxide used as the base material may be present in a structure which contains water of crystallization.

The abovementioned object is achieved, in particular, by manganese dioxide electrodes comprising coated inorganic particles in an amount of from 0.01 to 20% by weight, based on the amount of manganese dioxide comprised in the electrode.

The invention therefore relates to manganese dioxide electrodes modified by the addition of inorganically coated particles and to the use of these electrodes in rechargeable cells, in particular rechargeable alkaline batteries in which, by preference, zinc electrodes are used as counter-electrodes.

The invention also relates to a method for fabricating the novel manganese dioxide electrodes.

The manganese dioxide electrodes are fabricated by
a) the manganese dioxide powder being homogenized with an inorganic powder consisting of singly or multiply coated inorganic particles,
b) the mixture being, if required, mixed with an organic or inorganic binder and a conductive addition, preferably carbon black or graphite, and
c) the product obtained being processed to give an electrode.

Manganese dioxide electrodes according to the invention not only can be used for the fabrication of galvanic elements, electrochemical cells, of primary batteries, e.g. button cell batteries, but also exhibit particularly good characteristics in rechargeable cells, in particular rechargeable alkaline batteries.

Surprisingly, trials have shown that mixing of the manganese dioxide customarily used as a cathode material with commercially available inorganic coated particles, so-called perlescent pigments gives a starting material for fabricating manganese dioxide electrodes, from which cathodes or positive electrodes having considerably improved characteristics can be fabricated. These pigments are inorganic particles which can be coated with a wide variety of substances.

The trials carried out have shown that an addition of inorganic coated particles affords cathodes or positive electrodes having extended discharge times, if the manganese dioxide is admixed with from 0.01 to 20% by weight, based on the amount of manganese dioxide, of such inorganic particles in the form of coated mica particles, $SiO_2$ particles, $Al_2O_3$ particles, $ZrO_2$ particles or coated ZnO particles. The amount added in each case depends on the intended use of the manganese dioxide electrodes after fabrication. Whilst even the addition of a small amount of about 0.01% by weight of the abovementioned particles has a significant effect on the discharge times of commercially available batteries, additions of up to 20% by weight to cathode materials of button cell batteries can be worthwhile.

Modifying the cathode material achieves an increase in the primary capacity of the electrochemical cell by from 10 to 30% compared with commercially available zinc/manganese oxide batteries, whose cathodes are not modified. Moreover, modifying the electrode material makes it possible to achieve significantly improved rechargeability of electrochemical cells. An increase in the primary capacity by 30% or an increase in the rechargeability by 200% can be achieved, in particular, by the addition of 20% by weight of inorganic coated particles to the manganese dioxide employed. Accordingly it may be advisable to vary the amount added depending on the use to which the electrodes are put.

Found to be particularly suitable for modifying the manganese dioxide employed in the fabrication of electrodes were commercially available coated inorganic particles comprising mica as the support material. Such materials are:
mica coated with titanium dioxide in the anatase or rutile modification
mica coated with $SiO_2$ and/or $SnO_2$ and/or $TiO_2$
mica coated with alkaline earth metal titanates (Mg, Ca, Sr, Ba titanates), alkali metal titanates and/or lead titanate and/or manganese titanate
mica coated with stannates, tungstates, niobates or zirconates
mica coated with metal oxides ($Fe_2O_3$, NiO, CoO, $ZrO_2$, $SnO_2$, $Sb_2O_3$, PbO, $Pb_3O_4$ or $Bi_2O_3$)
mica coated with $ZrO_2$
mica coated with mixtures of these oxides and titanates.
Also suitable, however, for modifying are inorganic particles coated in the same way, in which particles of $SiO_2$, $Al_2O_3$, $ZrO_2$ serve as the support material. Good effects are achieved with the aid of particulate materials whose support materials are polarizable even per se, although this is not a prerequisite since improved capacities are measured even with materials whose support particles do not have these characteristics. It has been found to be particularly advantageous, however, for the coatings to consist of dielectric substances, in particular ferroelectric, piezoelectric or pyroelectric substances such as titanates, stannates, zirconates, tungstates, niobates or others.

Surprisingly, experiments have shown that the use, according to the invention, of particles with titanium dioxide coatings, in contrast to U.S. Pat. No. 5,342,712, results in a considerable increase in capacity of the experimental cell, irrespective of whether the coating has an anatase or a rutile structure. These experimental results also contrast with Application DE 33 37 568 A1, according to which a manganese dioxide modified mechanically with $TiO_2$ powder does not have any positive effect in terms of increased cyclability. It was therefore found, surprisingly, that as a result of the addition of inorganic particles which consist of a support material as mentioned above and a titanium dioxide layer applied on top of this, a distinct increase in the cyclability of the modified manganese dioxide is achieved, compared with conventional materials.

It was also found that the advantageous result is achieved without highly pure starting substances being used for modifying. Uniformly good results are achieved if the surfaces of the particles used for modifying the electrode material are coated with metal oxides from the group consisting of $Fe_2O_3$, NiO, CoO, $ZrO_2$, $SnO_2$, $TiO_2$, $Sb_2O_3$, PbO, $Pb_3O_4$, $Bi_2O_3$, $WO_3$, NbO or with mixtures of these metal oxides. Surprisingly good increases in the primary capacity and the cyclability are achieved by the addition of particles whose surface coatings are doped with foreign ions, such as $SnO_2$ coatings doped with antimony.

According to the present invention, simple mixing of a pulverulent additive with an inexpensive, commercially available pulverulent manganese dioxide affords a starting material for the fabrication of electrodes having improved cyclability.

To prepare the electrode material proper, the manganese dioxide powder is mixed with the desired quantity of particulate powder and is homogenized in a manner known to those skilled in the art. Homogenization can be effected by grinding in ball mills or attritors. Grinding using ball mills over a period of about eight hours or more proved effective in the trials carried out. The product thus homogenized can then be mixed with further additives, e.g. with organic or inorganic binders and conductivity additives. Organic binders which can be added for this purpose include PTFE, latex and other binders known to those skilled in the art. Of possible use as an inorganic binder is Portland cement. Particularly suitable is PTFE. Suitable conductivity additives include carbon black, graphite, steel wool and other conductive fibres. Particularly good results were achieved by the addition of carbon black and graphite in an amount of 4–10, in particular of about 5% by weight, based on the total amount.

Then the powder mixed with all the additives is processed, in a manner known per se, to produce electrodes. This can be effected by pressure-moulding at very high pressure between wire cloths consisting of an inert material such as nickel. Where appropriate, this may be followed by a treatment at elevated temperature, a so-called tempering procedure.

Electrodes thus fabricated can be used, in a known manner, for fabricating rechargeable cells in the presence of an alkaline electrolyte, in which the counter-electrode used can be a zinc electrode. Alternative designs of corresponding galvanic cells are also possible, however. For example, various additives such as gelling agents, silica gel or others can be employed to increase the viscosity of the essentially aqueous electrolyte. A suitable polymer fabric or bonded polymer batt can be fitted as a separator material between the electrodes and, should this be necessary, a spacer should be inserted. The polymer batt used can be in the form of materials consisting of poly(vinyl acetate), polypropylene or other inert polymers. Spacers such as those known from commercially available batteries may be of corrugated shape and consist, for example, of PVC.

For experimental purposes, the manganese dioxide mixtures according to the invention were made into electrodes by means of the addition, after grinding, of both a conductivity additive and a binder. The mixture thus obtained was pressure-moulded between two nickel wire meshes to produce cathodes.

The following examples are intended to illustrate the invention and to provide a better understanding thereof without, however, limiting the invention as such in any way.

EXAMPLES

Example 1

Fabrication of a Reference Electrode

To fabricate a manganese dioxide electrode, 30 mg of manganese dioxide (EMD-TRF), 150 mg of graphite (Lonza KS75) and 10 mg of PTFE powder are homogenized in a mortar. The powder mix obtained is pressure-moulded between two nickel meshes at a pressure of 30 kN/cm² to produce an electrode tablet having a diameter of 16 mm and a thickness of 1.2 mm. Together with a cadmium counter-electrode, this manganese dioxide electrode is incorporated into a button cell of size 2032. The separators used are one ply each of polypropylene FS 2123WI (from Freudenberg) and Celgard 2500 (from Hoechst). In addition, a corrugated separator made of PVC is used as a spacer. The electrolyte is KOH (9 mol/l). Discharge of the cell takes place at a specific discharge current of 100 mA/g of $MnO_2$ down to a discharge level of 50%, based on the theoretical 1 e⁻ capacity (154 mAh/g of $MnO_2$). Charging of the cell takes place in a special IV charging regime, consisting of a constant-current charging phase with a specific charging current of 50 mA/g of $MnO_2$ up to a cell voltage of 1.4 V and an ensuing 10 hour constant-voltage charging phase at $V_{const}=1.4$ V.

Example 2

In a ball mill, 9.0 g of manganese dioxide (EMD-TRF) and 1.0 g of a mica coated with titanium dioxide (Iriodin® 120 Glanzsatin, from Merck KGaA, Darmstadt), the latter having crystallized out into an anatase structure, are ground together over a period of eight hours. The modified manganese black thus obtained is tested in a cycling test.

To this end, a depolarizer mixture is prepared from:
33.4 mg of modified manganese dioxide
150 mg of graphite (Lonza KS75)
10 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. The overall content of modified mica in the positive electrode is 1.7%, based on mass. Together with a cadmium electrode, this electrode is inserted into a button cell of size 2032. The separators used are one ply each of polypropylene batt FS 2123 (from Freudenberg) and Celgard 2500 (from Hoechst). In addition, a corrugated separator made of PVC is used as a spacer. The electrolyte is a KOH solution (9 mol/l). The specific discharge current is 100 mA/g of $MnO_2$ and the discharge level is 50%, based on the theoretical 1 e⁻ capacity (154 mAh/g of $MnO_2$) Charging of the cell takes place under a special IV charging regime, consisting of a constant-current charging phase with a specific charging current of 50 mA/g of $MnO_2$ up to a cell voltage of 1.4 V and an ensuing 10 hour constant-voltage charging phase at $V_{const}=1.4$ V.

Example 3

In a ball mill, 9.0 g of manganese dioxide (EMD-TRF) and 1.0 g of mica which is multiply coated with titanium dioxide, silicon dioxide and antimony-doped tin oxide (Minatec® 30 CM, from Merck, Darmstadt) are ground together over a period of eight hours. The modified manganese dioxide thus obtained is tested in a cycling test.

To this end, a depolarizer mixture is prepared from:
33.4 mg of modified manganese dioxide
150.0 mg of graphite (Lonza KS75)
10.0 mg of PTFE powder This mixture is homogenized in a mortar and was pressure-moulded between two nickel meshes at a compaction pressure of 30 kN/cm² to produce an electrode tablet having a diameter of 16 mm and a thickness of about 1.2 mm. The overall content of modified mica in the positive electrode is 1.7%, based on mass. Together with a cadmium electrode, this electrode is inserted into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is a KOH solution (9 mol/l).

The specific discharge current is 100 mA/g of $MnO_2$ and the discharge level is 50%, based on the theoretical 1 e⁻ capacity (154 mAh/g of $MnO_2$). Charging of the cell takes place in a special IV charging regime, consisting of a constant current charging phase with a specific charging current of 50 mA/g of $MnO_2$ up to a cell voltage of 1.4 V and an ensuing 10 hour constant-voltage charging phase at $V_{const}$=1.4 V.

Example 4

In a ball mill, 9.0 g of manganese dioxide (EMD-TRF) and 1.0 g of a mica coated with titanium dioxide (Iriodin® 111 Feinsatin, from Merck KGaA, Darmstadt), the latter having crystallized out into a rutile structure, are ground together over a period of eight hours. The modified manganese black thus obtained is tested in a cycling test.

To this end, a depolarizer mixture is prepared from:
33.4 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. The overall content of modified mica in the positive electrode is 1.7%, based on mass. Together with a cadmium electrode, this electrode is inserted into a button cell of size 2032. The separators used are one ply each of polypropylene batt FS 2123WI (from Freudenberg) and Celgard 2500 (from Hoechst). In addition, a corrugated separator is used as a spacer. The electrolyte is KOH (9 mol/l).

The specific discharge current is 100 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging-current of 50 mA/g of $MnO_2$ up to a cell voltage of 1.4 V and an ensuing 10 hour constant-voltage charging phase at $V_{const}$=1.4 V.

Example 5

In a ball mill, 9.0 g of manganese dioxide (EMD-TRF) and 1.0 g of mica which is multiply coated with rutile titanium dioxide, iron oxide ($Fe_2O_3$), tin oxide ($SnO_2$) and zirconium oxide ($ZrO_2$) (Iriodin® 9612 Silbergrau Feinsatin, from Merck KGaA, Darmstadt) are ground together over a period of eight hours. The modified manganese black thus obtained is tested in a cycling test.

To this end, a depolarizer mixture is prepared from:
33.4 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. The overall content of modified mica in the positive electrode is 1.7%, based on mass. Together with a cadmium electrode, the electrode is inserted into a button cell of size 2032. The separators used are one ply each of polypropylene batt FS 2123WI (from Freudenberg) and Celgard 2500 (from Hoechst). In addition, a corrugated separator is used as a spacer. The electrolyte is KOH (9 mol/l).

The specific discharge current is 100 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging current of 50 mA/g of $MnO_2$ up to a cell voltage of 1.4 V and an ensuing 10 hour constant-voltage charging phase at $V_{const}$=1.4 V.

Example 6 (Comparative Example)

A manganese dioxide electrode fabricated in accordance with Example 1 is inserted, together with a zinc electrode, into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is KOH (9 mol/l). The specific discharge current is 30 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging current of 30 mA/g of $MnO_2$ up to a cell voltage of 1.65 V and an ensuing 10 hour constant-voltage charging phase at $V_{const}$=1.65 V.

Example 7

In a ball mill, 91.5 parts of manganese dioxide (EMD-TRF) and 8.5 parts of a mica coated with titanium dioxide (Iriodin® 120 Glanzsatin, from Merck, Darmstadt), the latter having crystallized out into an anatase structure, are ground together over a period of eight hours. The modified manganese black thus obtained is tested in a cycling test.

To this end, a depolarizer mixture is prepared from:
32.8 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. Together with a zinc electrode, this electrode is inserted into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is KOH (9 mol/l).

The specific discharge current is 30 mA/g of $MnO_2$ and the discharge level is 50%, based on the theoretical 1 e⁻ capacity (154 mAh/g of $MnO_2$). Charging of the cell takes place under a special IV charging regime, consisting of a constant-current charging phase with a specific charging-current of 30 mA/g of $MnO_2$ up to a cell voltage of 1.65 V and an ensuing 10 hour constant-voltage charging phase at $V_{const}$=1.65 V.

Example 8

In a ball mill, 91.5 parts of manganese dioxide (EMD-TRF) and 8.5 parts of mica which is multiply coated with titanium dioxide, silicon dioxide and antimony-doped tin oxide (Minatec® 30 CM, from Merck, Darmstadt) are ground together over a period of eight hours. The modified manganese black thus obtained is tested in a cycling test.

To this end, a depolarizer mixture is prepared from:
32.8 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. Together with a zinc electrode, this electrode is inserted into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is KOH (9 mol/l).

The specific discharge current is 30 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging current of 30 mA/g of $MnO_2$ up to a cell voltage of 1.65 V and an ensuing 10 hour constant-voltage charging phase at $V_{const}$=1.65 V.

Example 9

In a ball mill, 91.5 parts of manganese dioxide (EMD-TRF) and 8.5 parts of a mica coated with titanium dioxide (Iriodin® 111 Feinsatin, from Merck, Darmstadt) the latter having crystallized out into a rutile structure, are ground together over a period of eight hours. The modified manganese black thus obtained is tested in a cycling test.

To this end, a depolarizer mixture is prepared from:
32.8 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. Together with a zinc electrode, this electrode is inserted into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is KOH (9 mol/l).

The specific discharge current is 30 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging current of 30 mA/g of $MnO_2$ up to a cell voltage of 1.65 V and an ensuing 10 hour constant-voltage charging phase at $V_{const}$=1.65 V.

Example 10

In a ball mill, 91.5 parts of manganese dioxide (EMD-TRF) and 8.5 parts of mica which is multiply coated with rutile titanium dioxide, iron oxide ($Fe_2O_3$), tin oxide ($SnO_2$) and zirconium oxide ($ZrO_2$) (Iriodin® 9612 Silbergrau Feinsatin WRII, from Merck, Darmstadt) are ground together over a period of eight hours. The modified manganese black thus obtained is tested in a cycling test.

To this end, a depolarizer mixture is prepared from:
32.8 mg of modified manganese dioxide
150.0 mg of graphite (Lonza KS75)
10.0 mg of PTFE powder This mixture is homogenized in a mortar and is pressure-moulded between two nickel meshes at a compaction pressure of 30 kN/cm² to produce an electrode tablet having a diameter of 16 mm and a thickness of about 1.2 mm. Together with a zinc electrode, this electrode is inserted into a button cell of size 2032. The separators used are one ply each of polypropylene batt FS 2123WI (from Freudenberg) and Celgard 2500 (from Hoechst). In addition, a corrugated separator made of PVC is used as a spacer. The electrolyte is KOH (9 mol/l).

The specific discharge current is 30 mA/g of $MnO_2$ and the discharge level is 50%, based on the theoretical 1 e⁻ capacity (154 mAh/g of $MnO_2$). Charging of the cell takes place in a special IV charging regime, consisting of a constant-current charging phase with a specific charging current of 30 mA/g of $MnO_2$ up to a cell voltage of 1.65 V and an ensuing 10 hour constant-voltage charging phase at $V_{const}$=1.65 V.

Table 1 shows, for working Examples 6 to 10, the number of cycles achieved before the cell voltage drops below 0.9 V.

TABLE 1

| Cell according to example | Cell size | Number of cycles |
| --- | --- | --- |
| 6 | Button cell 2032 | 23 |
| 7 | Button Cell 2032 | 54 |
| 8 | Button cell 2032 | 56 |
| 9 | Button cell 2032 | 39 |
| 10 | Button cell 2032 | 39 |

Representation of the Experimental Results

FIG. 1 shows the discharge behaviour of a reference cell in accordance with Example 1. The numbers on the discharge curves, shown offset with respect to time, indicate the respective cycle. The charge curves are not shown. In the course of cycling, a drop below a final discharge voltage of 0.1 V vs. Cd/Cd(OH)$_2$ is observed after 39 cycles.

Figure 2:
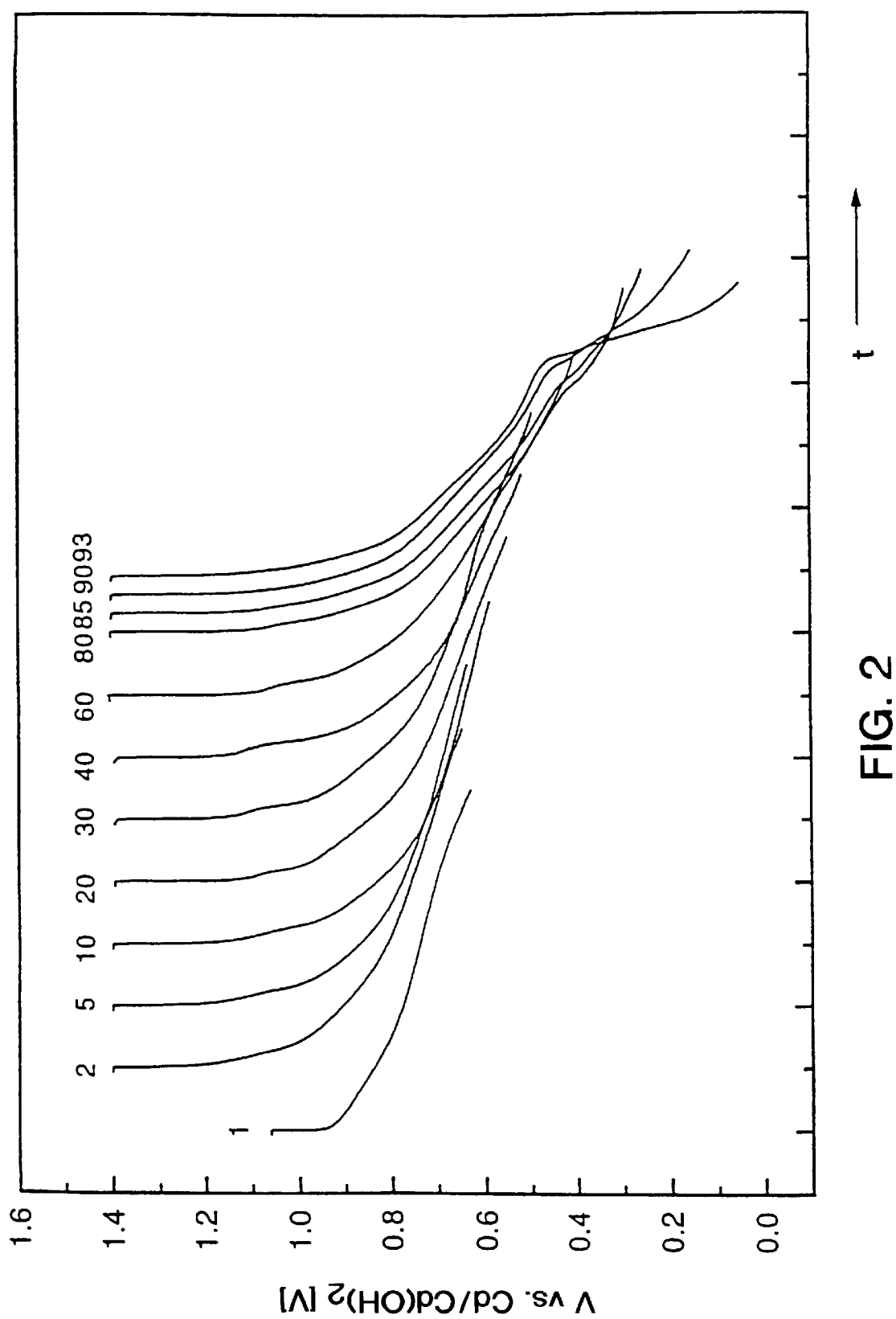

FIG. 2 shows the discharge behaviour of such a button cell equipped with a positive electrode, which contains manganese dioxide modified according to the invention. The numbers against the discharge curves, shown offset with respect to time, indicate the respective cycle. The charge curves are not shown. In the course of cycling a cell comprising a manganese dioxide modified in accordance with Example 2, a drop below a final discharge voltage of 0.1 V vs. Cd/Cd(OH)$_2$ is observed after 93 cycles. This corresponds to an increase in the number of cycles compared with the reference cell in accordance with Example 1, by about 140%.

Figure 3:
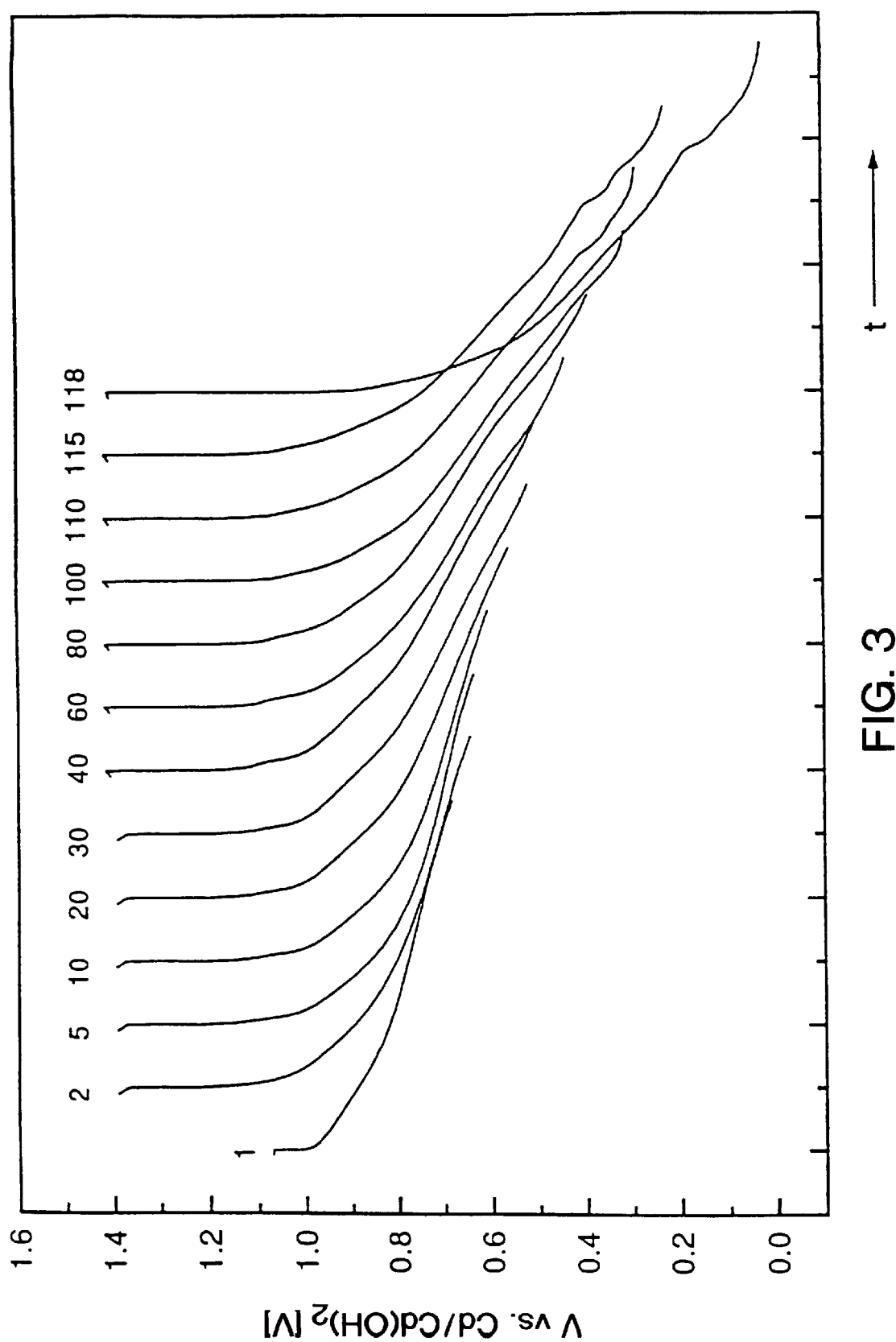

FIG. 3 shows the discharge behaviour of such a button cell equipped with a positive electrode, which contains manganese dioxide modified according to the invention. The numbers against the discharge curves, shown offset with respect to time, indicate the respective cycle. The charge curves are not shown. In the course of cycling a cell comprising a manganese dioxide modified in accordance with Example 3, a drop below a final discharge voltage of 0.1 V vs. Cd/Cd(OH)$_2$ is observed after 118 cycles. This corresponds to an increase in the cyclability of the manganese dioxide electrode by about 200%.

Figure 4:
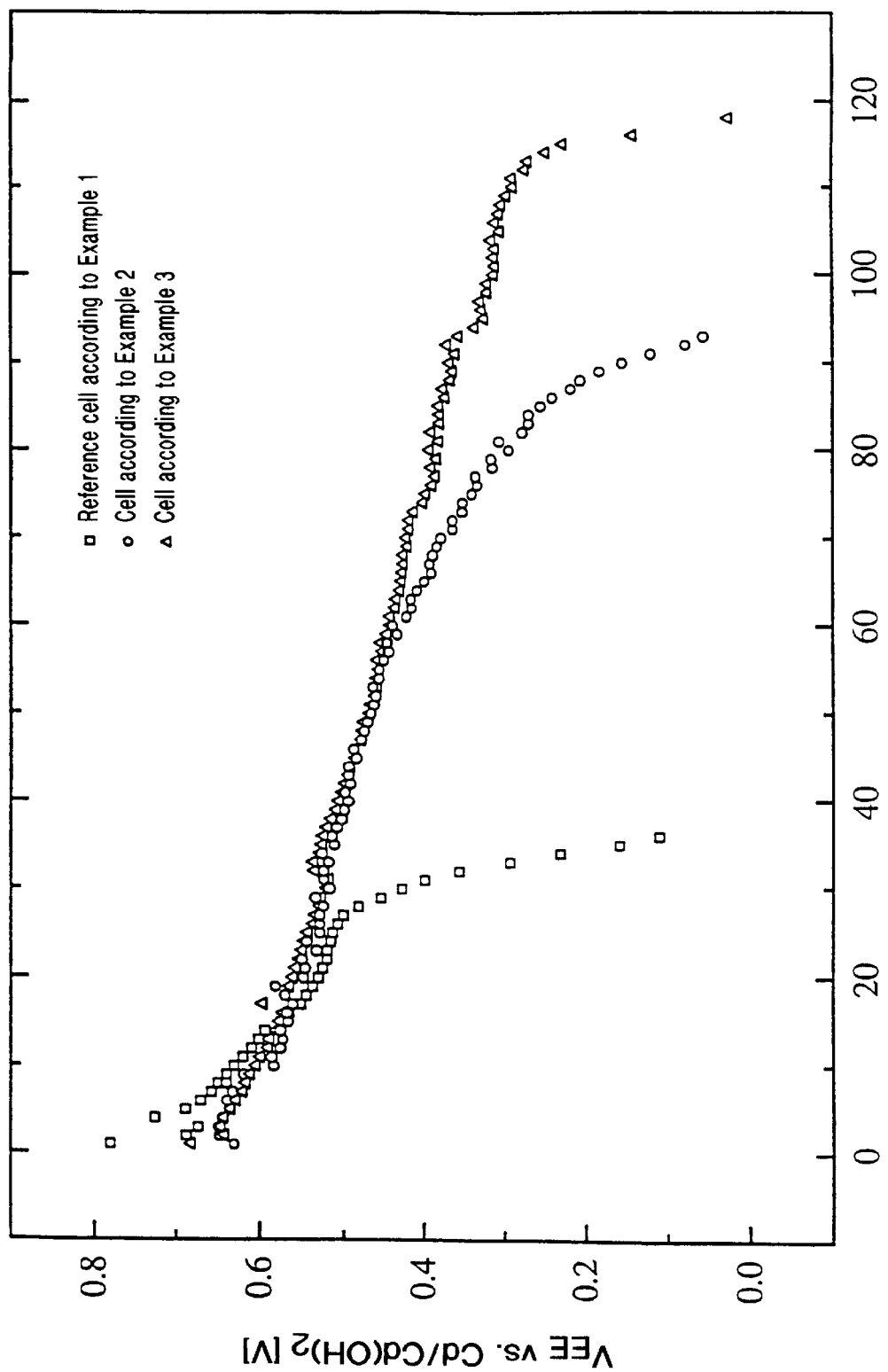

FIG. 4 once more shows the final discharge voltages from FIGS. 1, 2 and 3 as a function of the number of cycles. This illustration clearly demonstrates the effect of the additives used.

Figure 5:
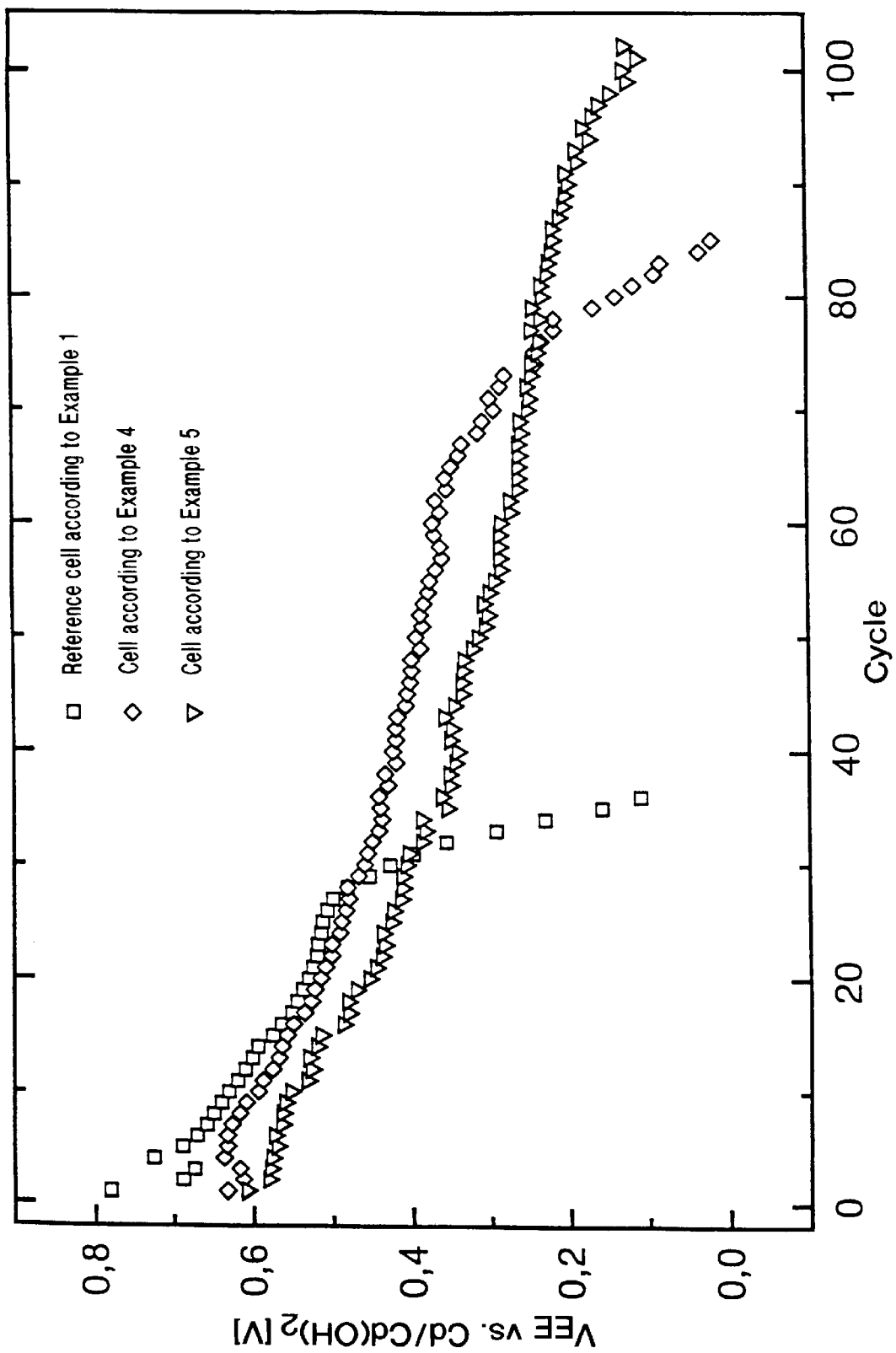

FIG. 5 shows the final discharge voltages of button cells equipped with positive electrodes, which contain manganese dioxide modified according to the invention, in accordance with Examples 4 and 5 compared with a reference cell in accordance with Example 1. The illustration clearly demonstrates the effect of the additives used.

What is claimed is:

1. A manganese dioxide electrode comprising at least one coated inorganic particle comprising a coating doped with foreign ions; wherein the manganese dioxide electrode is for a rechargeable battery or cell.

2. A manganese dioxide electrode according to claim 1, wherein the coated inorganic particles comprise at least one support particle having a material comprising mica, $SiO_2$, $Al_2O_3$, $ZrO_2$ or ZnO.

3. A manganese dioxide electrode according to claim 1, wherein the coated inorganic particle has a single coating or multiple coatings of a dielectric substance.

4. A manganese dioxide electrode according to claim 1, wherein the coated inorganic particle has a single or multiple coatings of a ferroelectric, a piezoelectric or a pyroelectric substance.

5. A manganese dioxide electrode according to claim 1, wherein the coated inorganic particle has a single coating or multiple coatings of titanates, stannates, zirconates, tungstates, niobates, silicates or mixtures thereof, with the proviso that, in the case of multiple coatings, the individual layers are identical or different.

6. A manganese dioxide electrode according to claim 1, wherein the coated inorganic particle has a coating of anatase or rutile titanium dioxide.

7. A manganese dioxide electrode according to claim 1, wherein the coated inorganic particle has a coating of a metal oxide of $Fe_2O_3$NiO, CoO, $ZrO_2$, $SnO_2$, $TiO_2$, $Sb_2O_3$, PbO, $Pb_3O_4$, $Bi_2O_3$, $WO_3$, NbO or mixtures thereof.

8. A manganese dioxide electrode according to claim 1, wherein the coated inorganic particle comprises at least one coating of $SnO_2$ doped with antimony ions.

9. A manganese dioxide electrode according to claim 1, wherein the manganese dioxide has a structure containing water of crystallization.

10. A manganese dioxide electrode according to claim 1, comprising from 0.01 to 20% by weight of inorganic coated particles, based on the amount of manganese dioxide.

11. A method for fabricating manganese dioxide electrode according to claim 1, comprising a) homogenizing a manganese dioxide powder with an inorganic powder of several single and/or multiple coated inorganic particles, b) optionally mixing the homogenized mixture with an, optionally, organic or inorganic binder and carbon black or graphite, and c) processing the homogenized mixture or mixture from b) to give an electrode.

12. A method according to claim 11, wherein homogenizing the manganese dioxide powder is effected by grinding.

13. A method according to claim 11, wherein processing the homogenized mixture or mixture from b) is effected by pressure-moulding, optionally between two support materials, and optionally by tempering.

14. A method of fabricating a rechargeable cell comprising providing a manganese dioxide electrode according to claim 1.

15. A method of fabricating a rechargeable button cell battery comprising providing a manganese dioxide electrode according to claim 1.

16. A rechargeable battery or cell comprising the manganese dioxide electrode according to claim 1.

17. A manganese dioxide electrode according to claim 1, wherein the coating is a metal oxide and the foreign ions are metal ions.

18. A method of fabricating a rechargeable battery or cell comprising:

providing a manganese dioxide electrode comprising at least one coated inorganic particle comprising a coated doped with foreign ions; wherein the manganese dioxide electrode in the presence of aqueous alkaline electrolytes serves as a cathode or a positive electrode and the anode is a zinc electrode or a cadmium electrode.

19. A manganese dioxide electrode comprising at least one coated inorganic particle wherein the coated inorganic particle comprises at least one coating of $SnO_2$ doped with antimony ions.

20. A manganese dioxide electrode according to claim 19, further comprising carbon black and graphite in an amount of 4–10% by weight.

* * * * *

UNITED STATES PATENT AND TRADEMARK OFFICE
CERTIFICATE OF CORRECTION

PATENT NO. : 6,337,160 B1
DATED : January 8, 2002
INVENTOR(S) : Hilarius et al.

It is certified that error appears in the above-identified patent and that said Letters Patent is hereby corrected as shown below:

<u>Column 12,</u>
Line 28, delete (second occurrence) of the word "coated" and insert -- coating --.

Signed and Sealed this

Fifteenth Day of October, 2002

*Attest:*

*Attesting Officer*

JAMES E. ROGAN
*Director of the United States Patent and Trademark Office*